US010920025B2

(12) United States Patent
Liu et al.

(10) Patent No.: US 10,920,025 B2
(45) Date of Patent: Feb. 16, 2021

(54) POLYOLEFIN RESIN POWDER SUITABLE FOR SELECTIVE LASER SINTERING AND ITS PREPARATION METHOD

(71) Applicants: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

(72) Inventors: Jianye Liu, Beijing (CN); Shijun Zhang, Beijing (CN); Liqiu Chu, Beijing (CN); Liying Zhang, Beijing (CN); Hao Zou, Beijing (CN); Mu Dong, Beijing (CN); Dali Gao, Beijing (CN); Baige Chou, Beijing (CN); Jingbo Shao, Beijing (CN); Yun Lyu, Beijing (CN); Hua Yin, Beijing (CN); Qingquan Yang, Beijing (CN); Jie Li, Beijing (CN); Yiqing Bai, Beijing (CN); Yihui Xu, Beijing (CN)

(73) Assignees: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

( * ) Notice: Subject to any disclaimer, the term of this patent is extended or adjusted under 35 U.S.C. 154(b) by 277 days.

(21) Appl. No.: 15/768,429

(22) PCT Filed: Apr. 15, 2016

(86) PCT No.: PCT/CN2016/079396
§ 371 (c)(1),
(2) Date: Apr. 13, 2018

(87) PCT Pub. No.: WO2017/063351
PCT Pub. Date: Apr. 20, 2017

(65) Prior Publication Data
US 2018/0355122 A1 Dec. 13, 2018

(30) Foreign Application Priority Data
Oct. 13, 2015 (CN) .......................... 201510665024.3
Nov. 6, 2015 (CN) .......................... 201510750235.7

(51) Int. Cl.
*C08J 3/14* (2006.01)
*B33Y 70/00* (2020.01)
(Continued)

(52) U.S. Cl.
CPC ...... *C08J 3/14* (2013.01); *B29B 9/10* (2013.01); *B29B 13/007* (2013.01); *B29B 13/02* (2013.01);
(Continued)

(58) Field of Classification Search
CPC . C08J 3/14; B33Y 70/00; B33Y 10/00; B29B 9/10; B29B 13/007; B29B 13/02; B29B 13/04; B29B 13/06; B29B 2009/125; C08F 6/12; C08F 110/02; C08F 110/06; C08K 3/22; C08K 3/346; C08K 3/36; C08K 2003/2206; C08L 23/12; B29C 64/153; B22F 1/0059; B29K 2023/06; B29K 2023/12; B29K 2105/251
(Continued)

(56) References Cited

U.S. PATENT DOCUMENTS 5,733,497 A * 3/1998 McAlea ............... B29C 64/153
264/497
5,891,940 A * 4/1999 Chen ...................... C08K 5/20
524/229
2015/0148467 A1 5/2015 Greger et al.

FOREIGN PATENT DOCUMENTS

CN 101138651 A 3/2008
CN 102140246 A 8/2011
(Continued)

OTHER PUBLICATIONS

MiSUMi Technical Tutorial #107 Melt Flow Rate (MFR) of Plastics (https://www.misumi-techcentral.com/tt/en/mold/2012/01/107.html) (Year: 2012).*

*Primary Examiner* — Ling Siu Choi
*Assistant Examiner* — Ronald Grinsted
(74) *Attorney, Agent, or Firm* — Novick, Kim & Lee, PLLC; Allen Xue

(57) ABSTRACT

A method for preparing a polyolefin resin powder has the steps of
a) heat dissolving a polyolefin resin in an organic solvent having a solubility parameter less than or equal to the solubility parameter of the polyolefin resin to obtain a polyolefin resin solution;
b) cooling the polyolefin resin solution to precipitate a solid, thereby obtaining a solid-liquid mixture;
c) optionally adding an adjuvant to the solid-liquid mixture and mixing; and
d) conducting solid-liquid separation and drying to obtain a polyolefin resin powder suitable for selective laser sintering.

The difference between the solubility parameters of the organic solvent and of the polyolefin resin is within 0-20% of the solubility parameter of the polyolefin resin.
The polyolefin resin powder obtained according to this method has good antioxidant property, good powder flowability, moderate size, smooth surface, suitable bulk density, and suitable dispersibility and particle size distribution.

23 Claims, 2 Drawing Sheets

(51) Int. Cl.
| | |
|---|---|
| *B29B 9/10* | (2006.01) |
| *B29B 13/00* | (2006.01) |
| *B29B 13/02* | (2006.01) |
| *B29B 13/04* | (2006.01) |
| *B29B 13/06* | (2006.01) |
| *C08F 6/12* | (2006.01) |
| *C08F 110/02* | (2006.01) |
| *C08F 110/06* | (2006.01) |
| *C08K 3/22* | (2006.01) |
| *C08K 3/34* | (2006.01) |
| *C08K 3/36* | (2006.01) |
| *C08L 23/12* | (2006.01) |
| *B33Y 10/00* | (2015.01) |
| *B29C 64/153* | (2017.01) |
| *B22F 1/00* | (2006.01) |
| *B29B 9/12* | (2006.01) |
| *B29K 23/00* | (2006.01) |
| *B29K 105/00* | (2006.01) |

(52) U.S. Cl.
CPC .............. *B29B 13/04* (2013.01); *B29B 13/06* (2013.01); *B33Y 70/00* (2014.12); *C08F 6/12* (2013.01); *C08F 110/02* (2013.01); *C08F 110/06* (2013.01); *C08K 3/22* (2013.01); *C08K 3/346* (2013.01); *C08K 3/36* (2013.01); *C08L 23/12* (2013.01); *B22F 1/0059* (2013.01); *B29B 2009/125* (2013.01); *B29C 64/153* (2017.08); *B29K 2023/06* (2013.01); *B29K 2023/12* (2013.01); *B29K 2105/251* (2013.01); *B33Y 10/00* (2014.12); *C08K 2003/2206* (2013.01)

(58) Field of Classification Search
USPC ......................................................... 264/497
See application file for complete search history.

(56) References Cited

FOREIGN PATENT DOCUMENTS

| | | | | |
|---|---|---|---|---|
| CN | 102399371 | A | 4/2012 | |
| CN | 103374223 | A | 10/2013 | |
| CN | 103467823 | A | 12/2013 | |
| CN | 103951971 | A | 7/2014 | |
| CN | 103980401 | A | 8/2014 | |
| CN | 103980608 | A | 8/2014 | |
| CN | 103992560 | A | 8/2014 | |
| CN | 104031319 | A | 9/2014 | |
| CN | 104497323 | A | 4/2015 | |
| GB | 1489501 | A * | 10/1977 | ............... C08J 3/14 |
| GB | 1489501 | A | 10/1977 | |
| JP | S50121356 | A | 9/1975 | |
| JP | S52019756 | S | 2/1977 | |
| JP | S6416806 | A | 1/1989 | |
| JP | 2011074345 | A | 4/2011 | |
| WO | 2004113042 | A2 | 12/2004 | |
| WO | 2005111119 | A1 | 11/2005 | |

* cited by examiner

POLYOLEFIN RESIN POWDER SUITABLE FOR SELECTIVE LASER SINTERING AND ITS PREPARATION METHOD

TECHNICAL FIELD

The present invention relates to the technical field of polymer processing, in particular to a method for preparing a polyolefin resin powder and a polyolefin resin powder obtained thereby and its use for selective laser sintering.

BACKGROUND ART

Selective Laser Sintering (SLS) technology is a rapid molding technology. It is currently most widely applicable and is the most promising technology in additive manufacturing technology showing in recent years a rapid development trend. The SLS technology is a method in which a computer first scans a three-dimensional solid article, and then high-strength laser light is used to irradiate material powders pre-spreading on a workbench or a component, and selectively melt-sinter it layer-by-layer, thereby realizing a layer-by-layer molding technology. The SLS technology has a high degree of design flexibility, is capable of producing accurate models and prototypes, and is capable of molding components that have reliable structure and can be used directly. Moreover, it shortens the production cycle and simplifies the process, so that it is particularly suitable for the development of new products.

Theoretically, the types of molding materials that can be used for the SLS technology are relatively extensive, such as polymers, paraffins, metals, ceramics, and their composites. However, the performances and properties of molding materials are one of the essential factors to successful sintering of the SLS technology, because they directly affect the molding speed, precision, physical and chemical properties and overall performance of molded parts. Currently, the polymer powdery raw materials that can be directly applied to the SLS technology for successfully manufacturing molded products with small dimensional deviations, good surface regularity, and low porosity are rarely seen in the market. Therefore, it is urgent to develop and improve the polymer types applicable to the SLS technology and their corresponding solid powdery raw materials.

In the prior art, a pulverization method such as a cryogenic pulverization method is generally used to prepare powdery raw materials suitable for the SLS. For example, polypropylene powders obtained by cryogenic pulverization method is disclosed in CN104031319A. However, on one hand, this method requires a specific equipment. On the other hand, the surface of the prepared powdery raw material particle is rough, the particle size is not uniform enough, and the shape is irregular, which is not conducive to the formation of sintered molded body and affects the performance of the molded body.

In addition, a precipitation method may be used to prepare polymer powdery raw materials, such as polyamide powders. In this method, the polyamide is usually dissolved in a suitable solvent, uniformly dispersed in the solvent by stirring, and then the powders are precipitated upon cooling.

For example, CN103374223A discloses a precipitation polymer powder based on an AABB-type polyamide, which is obtained by reprecipitating a polyamide formed by polycondensation of a diamine and a dicarboxylic acid. In the method described in this patent, alcoholic solvents are used during reprecipitation.

SUMMARY OF THE INVENTION

A first aspect of the present invention is to provide a polyolefin resin powder and a preparation method thereof and its use for selective laser sintering. The polyolefin resin powder provided according to the present invention has good oxidation resistance, good powder flowability, moderate size, suitable bulk density, well-proportioned particle shape and uniform particle size distribution, which is particularly suitable for selective laser sintering to prepare various molded articles.

The method for preparing a polyolefin resin powder according to the present invention includes the following steps:
a) heat dissolving a polyolefin resin in an organic solvent having a solubility parameter less than or equal to the solubility parameter of the polyolefin resin to obtain a polyolefin resin solution;
b) cooling the polyolefin resin solution to precipitate a solid, thereby obtaining a solid-liquid mixture;
c) optionally adding an adjuvant to the solid-liquid mixture and mixing;
d) conducting solid-liquid separation and drying to obtain a polyolefin resin powder suitable for selective laser sintering;
wherein the difference between the solubility parameters of the organic solvent and of the polyolefin resin is within 0-20% of the solubility parameter of the polyolefin resin.

A second aspect of the present invention lies in a polyolefin resin powder obtained according to the method of the present invention.

A third aspect of the present invention lies in a selective laser sintering method.

A fourth aspect of the present invention lies in use of a polyolefin resin powder obtained according to the method of the present invention in a method of producing a three-dimensional object.

DETAILED DESCRIPTION OF THE INVENTION

In the preparation method of the polyolefin resin powder according to the present invention, there is no particular limitation on a suitable polyolefin as long as it can be made in the form of a powder material.

Polyolefins suitable for use in the method of the present invention may be selected from polymers which are obtained by polymerizing or copolymerizing linear, branched or cyclic olefins, e.g. $C_2$-$C_{10}$ olefins, preferably α-olefins, or mixtures of these polymers. Suitable olefins include, for example, ethylene, propylene, 1-butene, 1-pentene, 1-hexene, 1-octene, 4-methyl-1-pentene, and the like.

In a preferred embodiment, the polyolefin is selected from polypropylene (PP) and polyethylene (PE) or mixtures thereof. More preferably, the polyolefin is one of polypropylene or polyethylene.

In another preferred embodiment, the polypropylene is at least one selected from the group consisting of homopolypropylene resin and atactic polypropylene resin. Preferably, the homopolypropylene resin has an isotacticity of 95%, for example 95-98%; and the atactic polypropylene resin has an isotacticity of <95%, for example 91-94.5%.

In a preferred embodiment of the present invention, the homopolypropylene resin and the atactic polypropylene resin have a melt index, measured at 210° C. and a load of 2.16 kg, of 20-100 g/10 min, preferably 30-80 g/10 min. In another preferred embodiment of the present invention, the polyethylene resin has a density of 0.900 g/cm$^3$, preferably 0.910-0.990 g/cm$^3$; a melt index, measured at 190° C. and a load of 2.16 kg, of 20-100 g/10 min, preferably 30-80 g/10 min. Within these ranges, the polyolefin resin exhibits good flowability, which is advantageous to the laser sintering process.

Although organic solvent precipitation technology has been used for separation and purification of biochemical substances, especially protein, or for precipitation to prepare crystals, there are currently few reports on the preparation of resin powdery material using organic solvent precipitation method, particularly polyolefin resin powders, which can be used for selective laser sintering. In the method according to the present invention, it is important to select out the organic solvent for dissolving the polyolefin resin which should be a poor solvent for the aforementioned polyolefin resin under normal temperature and normal pressure. Therefore, the organic solvent is selected to have a solubility parameter less than or equal to the solubility parameter of the polyolefin resin, and the difference is within 0-20%, preferably within 0-15%, for example, within 0-12% of the solubility parameter of the polyolefin resin.

In addition, in another advantageous embodiment, the solvent is further selected to be a low boiling solvent. In the context of the present invention, the term "low boiling (solvent)" means that the solvent has a boiling point of no more than 160° C., such as no more than 150° C. or 130° C., at normal pressure.

Preferably, in step a), the organic solvent is used in an amount of 600-1200 parts by weight, preferably 800-1000 parts by weight, based on 100 parts by weight of the polyolefin resin. When the organic solvent is used in an amount within this range, a polyolefin resin powder having good morphology and dispersibility can be obtained.

In an advantageous embodiment, the organic solvent is selected from $C_5$-$C_{12}$ alkanes, preferably $C_5$-$C_9$ alkanes, more preferably at least one selected from the group consisting of n-pentane, isopentane, n-hexane, 2-methylpentane, 3-methylpentane, 2,2-dimethylbutane, 2,3-dimethylbutane, cyclohexane, n-heptane, 2-methylhexane, 3-methylhexane, 2,2-dimethylpentane, 2,3-dimethylpentane, 2,4-dimethylpentane, 3,3-dimethylpentane, 3-ethylpentane, 2,2,3-trimethylbutane, n-octane, and n-nonane.

In a more preferred embodiment, the organic solvent is selected from $C_6$-$C_8$ alkanes such as n-hexane, n-heptane and/or n-octane.

The inventors of the present invention have further found through extensive experiments that when using the above organic solvents, particularly n-hexane and/or n-heptane, to dissolve the polyolefin resin and cooling to precipitate, the polyolefin resin can precipitate in a spherical and/or spheroidal shape, with a particle size of 25-150 µm. The obtained polyolefin resin powder has smooth surface, good dispersibility and small size distribution, and is particularly suitable for selective laser sintering technology.

In step a) of the method according to the present invention, the polyolefin resin is advantageously heated to a temperature of 60-200° C., e.g., 70-190° C. or 80-160° C. In a specific embodiment, polypropylene resin is heated to 90-180° C., preferably 100-150° C., more preferably 110-140° C. In another specific embodiment, polyethylene resin is heated to 70-150° C., preferably 80-130° C., more preferably 90-110° C.

In a preferred embodiment, the polyolefin resin solution may be held at said heating temperature for 30-90 minutes for sufficient dissolution. In addition, it is also preferable to perform the heating under an inert gas which is preferably nitrogen and which pressure may be 0.1-0.5 MPa, preferably 0.2-0.3 MPa.

In the method according to the present invention, the dissolution of step a) and the reprecipitation of step b) are advantageously carried out under pressure. The pressure can be established by vapor pressure of a solvent in a closed system.

In addition, a nucleating agent may optionally be added in step a). Said nucleating agent is at least one selected from the group consisting of silica, calcium oxide, calcium carbonate, barium sulfate, hydrotalcite, talc, carbon black, kaolin and mica. The nucleating agent may be used in an amount of 0.01-2 parts by weight, preferably 0.05-1 parts by weight, and more preferably 0.1-0.5 parts by weight, based on 100 parts by weight of the polyolefin resin.

The inventors of the present invention have found in experiments that, when these nucleating agents are added, the crystallization rate of the polyolefin resin can be increased, and the surface smoothness, heat resistance, and mechanical properties of the obtained polyolefin powder can be improved. Preferably, a nucleating agent is used in the case when a polypropylene resin powder is used as the polyolefin resin.

In step b), preferably, the average cooling rate is 0.1° C./min to 1° C./min. In addition, the polyolefin resin solution is preferably cooled down to a target temperature and held at the target temperature for 30-90 minutes, wherein the target temperature is preferably 10-30° C., for example, room temperature (i.e., about 25° C.).

The cooling of the polyolefin resin solution can be performed at a uniform rate in one step, or it can be performed in a stepwise manner. In a preferred embodiment of step b), the polyolefin resin solution is cooled to a target temperature via one or more intermediate temperatures and held at said intermediate temperatures for 30-90 minutes, said intermediate temperatures being in the range of 40-100° C., for example, 50-90° C. For example, for polypropylene, the intermediate temperature is preferably 60-100° C., more preferably 70-90° C.; for polyethylene, the intermediate temperature is preferably 40-80° C., more preferably 50-70° C. This will bring out a better precipitation effect. When two or more intermediate temperatures are used, it is advantageous to make the difference between two adjacent intermediate temperatures above 10° C.

It is easily understood that the intermediate temperature refers to the temperature between the heating temperature of step a) and the target temperature of step b). For example, in a specific embodiment, a homopolyolefin (e.g., homopolypropylene) resin solution can be cooled from a heating temperature of 130° C. to 90° C. and held at 90° C. for 60 minutes, and then cooled down to room temperature; or directly cooled from a heating temperature of 130° C. to room temperature. In another preferred embodiment, if atactic polyolefin (e.g., atactic polypropylene) resin solution is cooled from a heating temperature to 70-80° C. and held at this temperature for 30-90 minutes, a better precipitation effect can be obtained. In another specific embodiment, a polyethylene resin solution can be cooled from a heating temperature of 110° C. to 60-70° C. and held at this temperature for 30-90 minutes, and then cooled down to room temperature; or directly cooled from a heating temperature of 110° C. to room temperature.

With the heating and cooling manners of the present invention, powder particles having a uniform particle size distribution can be obtained, which thus are particularly suitable for selective laser sintering applications.

In addition, in step c) of the method according to the present invention, one or more adjuvants may optionally be added to the solid-liquid mixture. These adjuvants are known in the processing of polyolefin resins and, particularly include powder release agents, antioxidants, antistatic agents, antibacterial agents and/or glass fiber reinforcements. The antioxidant may be selected from antioxidant 1010 and/or antioxidant 168, preferably a combination of both. More preferably, the antioxidant is used in an amount of 0.1-0.5 parts by weight, preferably 0.2-0.4 parts by weight, based on 100 parts by weight of the polyolefin resin.

The inventors of the present invention have found in experiments that the addition of an antioxidant can not only prevent chain transfer of oxidation reaction, but also improve stability of the polyolefin resin such as polypropylene exposed to light, slow down oxidation of the polyolefin resin and increase heat-resistant stability and processing stability of the obtained polypropylene resin powder, thereby achieving the purpose of prolonging the service life.

The powder release agent may be a metallic soap, i.e., an alkali or alkaline earth metal based on alkane monocarboxylic or dimer acids, preferably at least one selected from the group consisting of sodium stearate, potassium stearate, zinc stearate, calcium stearate and lead stearate. In addition, the powder release agent may also be a nano-oxide and/or a nano-metal salt, preferably at least one selected from the group consisting of silica, titanium dioxide, aluminum oxide, zinc oxide, zirconium oxide, calcium carbonate and barium sulfate nanoparticles.

In the present invention, the powder release agent is used in an amount of 0.01-10 parts by weight, preferably 0.1-5 parts by weight, and preferably 0.5-1 parts by weight, based on 100 parts by weight of the polyolefin resin.

The powder release agent can be used to prevent adhesion among the polyolefin resin powder particles, thereby conducive to the processability thereof. On the other hand, it is also possible to prevent adhesion of antioxidants and make them more uniformly dispersed in the polyolefin resin to exert its antioxidant function. Further, the powder release agent can also act synergistically with antioxidants, and thus in particular, polyolefin resin powder with good dispersibility and flowability, which is suitable for selective laser sintering, can be obtained.

The antistatic agent is at least one selected from the group consisting of carbon black, graphite, graphene, carbon nanotubes, and conductive metal powders/fibers and metal oxides, and is preferably at least one selected from the group consisting of acetylene black, superconductive carbon black, special conductive carbon black, natural graphite, expandable graphite, single-walled carbon nanotubes, multi-walled carbon nanotubes, gold, silver, copper, iron, aluminum, nickel or stainless steel component-containing metal powder/fibers, alloy powder/fibers, composite powder/fibers, titanium oxide, zinc oxide, tin oxide, indium oxide and cadmium oxide.

In the present invention, the antistatic agent may be used in an amount of 0.05-15 parts by weight, preferably 0.1-10 parts by weight, and more preferably 0.25-5 parts by weight, based on 100 parts by weight of the polyolefin resin.

The antistatic agent can be used to impart excellent antistatic performance to selective laser sintered polyolefin products, and in the meantime reduce the electrostatic interaction among the polyolefin resin powder particles and between the polyolefin resin powder particles and the device, thereby improving the processability thereof. Furthermore, the powdery antistatic agent may also serve as a barrier to improve the dispersibility and flowability among the polyolefin resin powder particles.

The antibacterial agent is at least one selected from the group consisting of inorganic antibacterial agents such as supported types, nanometals and metal oxides and/or organic antibacterial agents such as organic guanidines, quaternary ammonium salts, phenol ethers, pyridines, imidazoles, isothiazolinones, and organometals, preferably at least one selected from the group consisting of zeolites, zirconium phosphate, calcium phosphate, hydroxyapatite, supported antimicrobial agents such as glass or activated carbon-supported silver ions, zinc ions or copper ions, nanogold or nanosilver, zinc oxide or titanium dioxide and polyhexamethylene guanidine hydrochloride or polyhexamethylene guanidine phosphate.

In the present invention, the antibacterial agent may be used in an amount of 0.05-1.5 parts by weight, preferably 0.05-1.0 parts by weight, more preferably 0.1-0.5 parts by weight, based on 100 parts by weight of the polyolefin resin.

The antibacterial agent can be used to impart excellent antibacterial properties to selective laser sintered polyolefin products, and improve the hygienic safety of polyolefin products.

Furthermore, when the antibacterial agent is an inorganic powder, it can serve as an auxiliary barrier for the polyolefin resin powder to improve dispersibility and flowability.

The glass fiber reinforcement is a glass fiber having a diameter of 5-20 μm and a length of 100-500 μm. It is preferably an alkali-free ultra-short glass fiber having a diameter of 5-15 μm and a length of 100-250 μm. In the present invention, the glass fiber reinforcement may be used in an amount of 5-60 parts by weight, preferably 5-50 parts by weight, and more preferably 10-50 parts by weight, based on 100 parts by weight of the polyolefin resin.

The glass fiber added can effectively improve the physical and mechanical properties of polyolefin products. Meanwhile, due to a greater thermal shrinkage of polyolefin, the glass fiber added also contributes to the dimensional stability of polyolefin products.

A second aspect of the present invention relates to polyolefin resin powders obtained according to the method of the present invention, the powder particles being spherical and/or spheroidal and having smooth surface, good dispersion and flowability, a uniform particle size distribution and suitable bulk density. Preferably, the polyolefin resin powder particles have a particle size of 25-150 μm, and a particle size distribution $D10=41-69$ μm, $D50=61-103$ μm, and $D90=85-138$ μm. The polyolefin resin powder provided according to the present invention is particularly suitable for selective laser sintering technology with a high success rate of sintering, and the obtained sintered product is featured with a small dimensional deviation from a predetermined product, less cross-sectional holes, a well-proportioned shape, and good mechanical properties.

In addition, a third aspect of the present invention is to provide a selective laser sintering method, in which a polyolefin resin powder prepared by the method described above is used as a powdery raw material for sintering. According to the selective laser sintering method provided by the present invention, a polyolefin molded product having a regular shape, a well-proportioned and smooth surface, and good mechanical properties can be prepared. Finally, a fourth aspect of the present invention relates to use of the polyolefin resin powders obtained according to the method of the present invention in a method of manufacturing a three-dimensional object, in particular a method in which a three-dimensional object is manufactured using selective laser sintering.

MODE OF CARRYING OUT THE INVENTION

Figure 1:
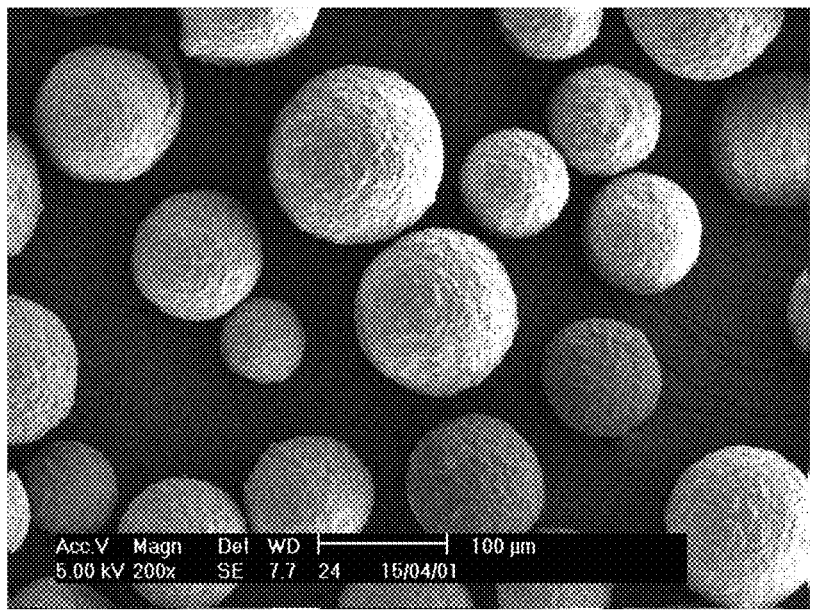
FIG. 1 is a scanning electron microscope (SEM) image of a polypropylene resin powder provided according to Example 1 of the present invention.
Figure 2:
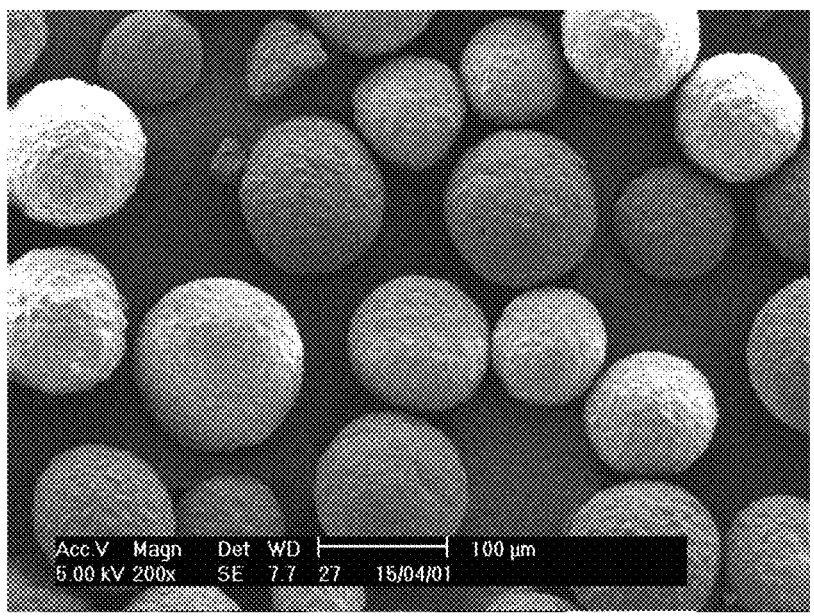
FIG. 2 is a scanning electron microscope (SEM) image of a polyethylene resin powder provided according to Example 17 of the present invention.
Figure 3:
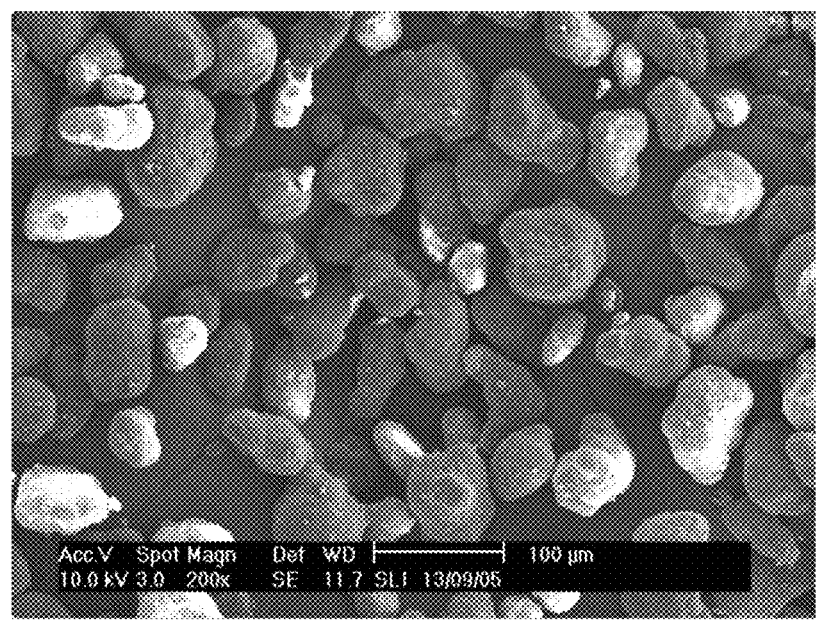
FIG. 3 is a scanning electron microscope image of commercially available polyamide 12 powder for selective laser sintering which is prepared by reprecipitation, for comparison with the present invention (FIGS. 1 and 2).

The present invention will be further illustrated by the following specific examples, but it should be understood that the scope of the present invention is not limited thereto. In the following examples, the particle size and particle size distribution of the obtained polyolefin resin powders were characterized using a laser particle size analyzer (Mastersizer 2000, Malvern, UK).

Example 1

100 parts by weight of homopolypropylene resin (isotacticity 95%, melt index (210° C., 2.16 kg) 30 g/10 min, solubility parameter 16.7 $MPa^{1/2}$) and 1000 parts by weight of n-hexane (solubility parameter 14.9 $MPa^{1/2}$) were placed in an autoclave, and 0.2 parts by weight of calcium oxide was added and mixed. A high-purity nitrogen gas was charged to 0.2 MPa; then the autoclave was heated up to 130° C., and held at this temperature for 60 minutes; thereafter, the autoclave was cooled down to 90° C. at a rate of 1.0° C./min with cooling water, and held at this temperature for 60 minutes; further, the autoclave was cooled down to room temperature at a rate of 1.0° C./min. In the resulting solid-liquid mixture, were added 0.25 parts by weight of antioxidant 1010 and 0.25 parts by weight of antioxidant 168 as well as 0.5 parts by weight of calcium stearate, and thereafter the material was subjected to centrifugal separation and vacuum drying to obtain a polypropylene resin powder suitable for selective laser sintering. The particle size and particle size distribution of the obtained polypropylene resin powder were listed in Table 1.

Example 2

100 parts by weight of homopolypropylene resin (isotacticity 97%, melt index (210° C., 2.16 kg) 50 g/10 min, solubility parameter 16.7 $MPa^{1/2}$) and 800 parts by weight of n-hexane (solubility parameter 14.9 $MPa^{1/2}$) were placed in an autoclave, and 0.4 parts by weight of calcium oxide was added and mixed. A high-purity nitrogen gas was charged to 0.3 MPa; then the autoclave was heated up to 140° C., and held at this temperature for 30 minutes; thereafter, the autoclave was cooled down to 85° C. at a rate of 1.0° C./min with cooling water, and held at this temperature for 60 minutes; further, the autoclave was cooled down to 20° C. at a rate of 1.0° C./min, and held at this temperature for 60 minutes. In the resulting solid-liquid mixture, were added 0.25 parts by weight of antioxidant 1010 and 0.25 parts by weight of antioxidant 168 as well as 1 part by weight of zinc stearate, and thereafter the material was subjected to centrifugal separation and vacuum drying to obtain a polypropylene resin powder suitable for selective laser sintering. The particle size and particle size distribution of the obtained polypropylene resin powder were listed in Table 1.

Example 3

100 parts by weight of homopolypropylene resin (isotacticity 96%, melt index (210° C., 2.16 kg) 50 g/10 min, solubility parameter 16.7 $MPa^{1/2}$) and 1200 parts by weight of n-hexane (solubility parameter 14.9 $MPa^{1/2}$) were placed in an autoclave, and 0.8 parts by weight of calcium oxide was added and mixed. A high-purity nitrogen gas was charged to 0.1 MPa; then the autoclave was heated up to 120° C., and held at this temperature for 90 minutes; thereafter, the autoclave was cooled down to room temperature at a rate of 0.1° C./min. In the resulting solid-liquid mixture, were added 0.1 parts by weight of antioxidant 1010 and 0.1 parts by weight of antioxidant 168 as well as 0.75 parts by weight of nano-silica, and thereafter the material was subjected to centrifugal separation and vacuum drying to obtain a polypropylene resin powder suitable for selective laser sintering. The particle size and particle size distribution of the obtained polypropylene resin powder were listed in Table 1.

Example 4

100 parts by weight of homopolypropylene resin (isotacticity 96%, melt index (210° C., 2.16 kg) 80 g/10 min, solubility parameter 16.7 $MPa^{1/2}$) and 1200 parts by weight of n-hexane (solubility parameter 14.9 $MPa^{1/2}$) were placed in an autoclave, and 0.3 parts by weight of kaolin was added and mixed. A high-purity nitrogen gas was charged to 0.1 MPa; then the autoclave was heated up to 120° C., and held at this temperature for 90 minutes; thereafter, the autoclave was cooled down to 85° C. at a rate of 0.5° C./min with cooling water, and held at this temperature for 60 minutes; further, the autoclave was cooled down to room temperature at a rate of 0.1° C./min, and held at this temperature for 60 minutes. In the resulting solid-liquid mixture, were added 0.3 parts by weight of antioxidant 1010 and 0.3 parts by weight of antioxidant 168 as well as 0.9 parts by weight of nano-zinc oxide, and thereafter the material was subjected to centrifugal separation and vacuum drying to obtain a polypropylene resin powder suitable for selective laser sintering. The particle size and particle size distribution of the obtained polypropylene resin powder were listed in Table 1.

Example 5

100 parts by weight of homopolypropylene resin (isotacticity 96%, melt index (210° C., 2.16 kg) 60 g/10 min, solubility parameter 16.7 $MPa^{1/2}$) and 1000 parts by weight of n-hexane (solubility parameter 14.9 $MPa^{1/2}$) were placed in an autoclave, and 0.5 parts by weight of kaolin was added and mixed. A high-purity nitrogen gas was charged to 0.3 MPa; then the autoclave was heated up to 140° C., and held at this temperature for 30 minutes; thereafter, the autoclave was cooled down to 30° C. at a rate of 0.5° C./min with cooling water, and held at this temperature for 30 minutes. In the resulting solid-liquid mixture, were added 0.2 parts by weight of antioxidant 1010 and 0.2 parts by weight of antioxidant 168 as well as 0.6 parts by weight of nano-calcium carbonate, and thereafter the material was subjected to centrifugal separation and vacuum drying to obtain a polypropylene resin powder suitable for selective laser sintering. The particle size and particle size distribution of the obtained polypropylene resin powder were listed in Table 1.

Example 6

100 parts by weight of homopolypropylene resin (isotacticity 95%, melt index (190° C., 2.16 kg) 40 g/10 min, solubility parameter 16.7 MPa$^{1/2}$) and 1200 parts by weight of n-heptane (solubility parameter 15.2 MPa$^{1/2}$) were placed in an autoclave, and 0.9 parts by weight of kaolin was added and mixed. A high-purity nitrogen gas was charged to 0.2 MPa; then the autoclave was heated up to 120° C., and held at this temperature for 90 minutes; thereafter, the autoclave was cooled down to 80° C. at a rate of 0.5° C./min with cooling water, and held at this temperature for 90 minutes; further, the autoclave was cooled down to room temperature at a rate of 0.2° C./min. In the resulting solid-liquid mixture, were added 0.15 parts by weight of antioxidant 1010 and 0.15 parts by weight of antioxidant 168 as well as 0.8 parts by weight of sodium stearate, and thereafter the material was subjected to centrifugal separation and vacuum drying to obtain a polypropylene resin powder suitable for selective laser sintering. The particle size and particle size distribution of the obtained polypropylene resin powder were listed in Table 1.

Example 7

100 parts by weight of homopolypropylene resin (isotacticity 95%, melt index (190° C., 2.16 kg) 40 g/10 min, solubility parameter 16.7 MPa$^{1/2}$) and 1200 parts by weight of cyclohexane (solubility parameter 16.6 MPa$^{1/2}$) were placed in an autoclave, and 0.2 parts by weight of silica was added and mixed. A high-purity nitrogen gas was charged to 0.2 MPa; then the autoclave was heated up to 120° C., and held at this temperature for 90 minutes; thereafter, the autoclave was cooled down to 80° C. at a rate of 0.5° C./min with cooling water, and held at this temperature for 90 minutes; further, the autoclave was cooled down to room temperature at a rate of 0.2° C./min. In the resulting solid-liquid mixture, were added 0.15 parts by weight of antioxidant 1010 and 0.15 parts by weight of antioxidant 168 as well as 0.8 parts by weight of sodium stearate, and thereafter the material was subjected to centrifugal separation and vacuum drying to obtain a polypropylene resin powder suitable for selective laser sintering. The particle size and particle size distribution of the obtained polypropylene resin powder were listed in Table 1.

Example 8

100 parts by weight of homopolypropylene resin (isotacticity 95%, melt index (190° C., 2.16 kg) 40 g/10 min, solubility parameter 16.7 MPa$^{1/2}$) and 1200 parts by weight of 2,2,3-trimethylbutane (solubility parameter 15.7 MPa$^{1/2}$) were placed in an autoclave, and 0.3 parts by weight of kaolin was added and mixed. A high-purity nitrogen gas was charged to 0.2 MPa; then the autoclave was heated up to 120° C., and held at this temperature for 90 minutes; thereafter, the autoclave was cooled down to 80° C. at a rate of 0.5° C./min with cooling water, and held at this temperature for 90 minutes; further, the autoclave was cooled down to room temperature at a rate of 0.2° C./min. In the resulting solid-liquid mixture, were added 0.15 parts by weight of antioxidant 1010 and 0.15 parts by weight of antioxidant 168 as well as 0.8 parts by weight of sodium stearate, and thereafter the material was subjected to centrifugal separation and vacuum drying to obtain a polypropylene resin powder suitable for selective laser sintering. The particle size and particle size distribution of the obtained polypropylene resin powder were listed in Table 1.

Example 9

100 parts by weight of atactic polypropylene resin (isotacticity 93.9%, melt index (210° C., 2.16 kg) 35 g/10 min, solubility parameter 16.7 MPa$^{1/2}$) and 1000 parts by weight of n-hexane (solubility parameter 14.9 MPa$^{1/2}$) were placed in an autoclave, and 0.2 parts by weight of silica was added and mixed. A high-purity nitrogen gas was charged to 0.2 MPa; then the autoclave was heated up to 120° C., and held at this temperature for 60 minutes; thereafter, the autoclave was cooled down to 80° C. at a rate of 1.0° C./min with cooling water, and held at this temperature for 60 minutes; further, the autoclave was cooled down to room temperature at a rate of 1.0° C./min. In the resulting solid-liquid mixture, were added 0.25 parts by weight of antioxidant 1010 and 0.25 parts by weight of antioxidant 168 as well as 0.5 parts by weight of calcium stearate, and thereafter the material was subjected to centrifugal separation and vacuum drying to obtain an atactic polypropylene resin powder suitable for selective laser sintering. The particle size and particle size distribution of the obtained polypropylene resin powder were listed in Table 1.

Example 10

100 parts by weight of atactic polypropylene resin (isotacticity 94.1%, melt index (210° C., 2.16 kg) 55 g/10 min, solubility parameter 16.7 MPa$^{1/2}$) and 800 parts by weight of n-hexane (solubility parameter 14.9 MPa$^{1/2}$) were placed in an autoclave, and 0.4 parts by weight of silica was added and mixed. A high-purity nitrogen gas was charged to 0.3 MPa; then the autoclave was heated up to 130° C., and held at this temperature for 30 minutes; thereafter, the autoclave was cooled down to 75° C. at a rate of 1.0° C./min with cooling water, and held at this temperature for 60 minutes; further, the autoclave was cooled down to 20° C. at a rate of 1.0° C./min, and held at this temperature for 60 minutes. In the resulting solid-liquid mixture, were added 0.25 parts by weight of antioxidant 1010 and 0.25 parts by weight of antioxidant 168 as well as 1 part by weight of zinc stearate, and thereafter the material was subjected to centrifugal separation and vacuum drying to obtain an atactic polypropylene resin powder suitable for selective laser sintering. The particle size and particle size distribution of the obtained polypropylene resin powder were listed in Table 1.

Example 11

100 parts by weight of atactic polypropylene resin (isotacticity 92.6%, melt index (210° C., 2.16 kg) 70 g/10 min, solubility parameter 16.7 MPa$^{1/2}$) and 1200 parts by weight of n-hexane (solubility parameter 14.9 MPa$^{1/2}$) were placed in an autoclave, and 0.8 parts by weight of silica was added and mixed. A high-purity nitrogen gas was charged to 0.1 MPa; then the autoclave was heated up to 110° C., and held at this temperature for 90 minutes; thereafter, the autoclave was cooled down to room temperature at a rate of 0.1° C./min. In the resulting solid-liquid mixture, were added 0.1 parts by weight of antioxidant 1010 and 0.1 parts by weight of antioxidant 168 as well as 0.75 parts by weight of nano-silica, and thereafter the material was subjected to centrifugal separation and vacuum drying to obtain an atactic polypropylene resin powder suitable for selective laser sintering. The particle size and particle size distribution of the obtained polypropylene resin powder were listed in Table 1.

Example 12

100 parts by weight of atactic polypropylene resin (isotacticity 93.2%, melt index (210° C., 2.16 kg) 60 g/10 min, solubility parameter 16.7 MPa$^{1/2}$) and 1200 parts by weight of n-hexane (solubility parameter 14.9 MPa$^{1/2}$) were placed in an autoclave, and 0.3 parts by weight of kaolin was added and mixed. A high-purity nitrogen gas was charged to 0.1 MPa; then the autoclave was heated up to 110° C., and held at this temperature for 90 minutes; thereafter, the autoclave was cooled down to 75° C. at a rate of 0.5° C./min with cooling water, and held at this temperature for 60 minutes; further, the autoclave was cooled down to room temperature at a rate of 0.1° C./min, and held at this temperature for 60 minutes. In the resulting solid-liquid mixture, were added 0.3 parts by weight of antioxidant 1010 and 0.3 parts by weight of antioxidant 168 as well as 0.9 parts by weight of nano-zinc oxide, and thereafter the material was subjected to centrifugal separation and vacuum drying to obtain an atactic polypropylene resin powder suitable for selective laser sintering. The particle size and particle size distribution of the obtained polypropylene resin powder were listed in Table 1.

Example 13

100 parts by weight of atactic polypropylene resin (isotacticity 94%, melt index (210° C., 2.16 kg) 65 g/10 min, solubility parameter 16.7 MPa$^{1/2}$) and 1000 parts by weight of n-hexane (solubility parameter 14.9 MPa$^{1/2}$) were placed in an autoclave, and 0.5 parts by weight of kaolin was added and mixed. A high-purity nitrogen gas was charged to 0.3 MPa; then the autoclave was heated up to 110° C., and held at this temperature for 30 minutes; thereafter, the autoclave was cooled down to 30° C. at a rate of 0.5° C./min with cooling water, and held at this temperature for 30 minutes. In the resulting solid-liquid mixture, were added 0.2 parts by weight of antioxidant 1010 and 0.2 parts by weight of antioxidant 168 as well as 0.6 parts by weight of nano-calcium carbonate, and thereafter the material was subjected to centrifugal separation and vacuum drying to obtain an atactic polypropylene resin powder suitable for selective laser sintering. The particle size and particle size distribution of the obtained polypropylene resin powder were listed in Table 1.

Example 14

100 parts by weight of atactic polypropylene resin (isotacticity 93.5%, melt index (210° C., 2.16 kg) 40 g/10 min, solubility parameter 16.7 MPa$^{1/2}$) and 1200 parts by weight of n-heptane (solubility parameter 15.2 MPa$^{1/2}$) were placed in an autoclave, and 0.9 parts by weight of kaolin was added and mixed. A high-purity nitrogen gas was charged to 0.2 MPa; then the autoclave was heated up to 110° C., and held at this temperature for 90 minutes; thereafter, the autoclave was cooled down to 70° C. at a rate of 0.5° C./min with cooling water, and held at this temperature for 90 minutes; further, the autoclave was cooled down to room temperature at a rate of 0.2° C./min. In the resulting solid-liquid mixture, were added 0.15 parts by weight of antioxidant 1010 and 0.15 parts by weight of antioxidant 168 as well as 0.8 parts by weight of sodium stearate, and thereafter the material was subjected to centrifugal separation and vacuum drying to obtain an atactic polypropylene resin powder suitable for selective laser sintering. The particle size and particle size distribution of the obtained polypropylene resin powder were listed in Table 1.

Example 15

100 parts by weight of atactic polypropylene resin (isotacticity 93.5%, melt index (210° C., 2.16 kg) 40 g/10 min, solubility parameter 16.7 MPa$^{1/2}$) and 1200 parts by weight of n-pentane (solubility parameter 14.4 MPa$^{1/2}$) were placed in an autoclave, and 0.2 parts by weight of silica was added and mixed. A high-purity nitrogen gas was charged to 0.2 MPa; then the autoclave was heated up to 110° C., and held at this temperature for 90 minutes; thereafter, the autoclave was cooled down to 70° C. at a rate of 0.5° C./min with cooling water, and held at this temperature for 90 minutes; further, the autoclave was cooled down to room temperature at a rate of 0.2° C./min. In the resulting solid-liquid mixture, were added 0.15 parts by weight of antioxidant 1010 and 0.15 parts by weight of antioxidant 168 as well as 0.8 parts by weight of sodium stearate, and thereafter the material was subjected to centrifugal separation and vacuum drying to obtain an atactic polypropylene resin powder suitable for selective laser sintering. The particle size and particle size distribution of the obtained polypropylene resin powder were listed in Table 1.

Example 16

100 parts by weight of atactic polypropylene resin (isotacticity 93.5%, melt index (210° C., 2.16 kg) 40 g/10 min, solubility parameter 16.7 MPa$^{1/2}$) and 1200 parts by weight of n-octane (solubility parameter 15.0 MPa$^{1/2}$) were placed in an autoclave, and 0.3 parts by weight of kaolin was added and mixed. A high-purity nitrogen gas was charged to 0.2 MPa; then the autoclave was heated up to 110° C., and held at this temperature for 90 minutes; thereafter, the autoclave was cooled down to 70° C. at a rate of 0.5° C./min with cooling water, and held at this temperature for 90 minutes; further, the autoclave was cooled down to room temperature at a rate of 0.2° C./min. In the resulting solid-liquid mixture, were added 0.15 parts by weight of antioxidant 1010 and 0.15 parts by weight of antioxidant 168 as well as 0.8 parts by weight of sodium stearate, and thereafter the material was subjected to centrifugal separation and vacuum drying to obtain an atactic polypropylene resin powder suitable for selective laser sintering. The particle size and particle size distribution of the obtained polypropylene resin powder were listed in Table 1.

Example 17

100 parts by weight of homopolypropylene resin (isotacticity 95%, melt index (210° C., 2.16 kg) 35 g/10 min, solubility parameter 16.7 MPa$^{1/2}$) and 1000 parts by weight of n-hexane (solubility parameter 14.9 MPa$^{1/2}$) were placed in an autoclave, and 0.2 parts by weight of calcium oxide was added and mixed. A high-purity nitrogen gas was charged to 0.2 MPa; then the autoclave was heated up to 130° C., and held at this temperature for 60 minutes; thereafter, the autoclave was cooled down to 90° C. at a rate of 1.0° C./min with cooling water, and held at this temperature for 60 minutes; further, the autoclave was cooled down to room temperature at a rate of 1.0° C./min. In the resulting solid-liquid mixture, were added 0.25 parts by weight of antioxidant 1010 and 0.25 parts by weight of antioxidant 168 as well as 0.5 parts by weight of calcium stearate and 0.5 parts by weight of single walled carbon nanotubes, and thereafter the material was subjected to centrifugal separation and vacuum drying to obtain a polypropylene resin powder suitable for selective laser sintering. The particle size and particle size distribution of the obtained polypropylene resin powder were listed in Table 1.

Example 18

100 parts by weight of homopolypropylene resin (isotacticity 96%, melt index (210° C., 2.16 kg) 45 g/10 min, solubility parameter 16.7 MPa$^{1/2}$) and 1200 parts by weight of n-hexane (solubility parameter 14.9 MPa$^{1/2}$) were placed in an autoclave, and 0.3 parts by weight of kaolin was added and mixed. A high-purity nitrogen gas was charged to 0.1 MPa; then the autoclave was heated up to 120° C., and held at this temperature for 90 minutes; thereafter, the autoclave was cooled down to room temperature at a rate of 0.1° C./min. In the resulting solid-liquid mixture, were added 0.1 parts by weight of antioxidant 1010 and 0.1 parts by weight of antioxidant 168, 0.75 parts by weight of nano-silica and 0.5 parts by weight of silver-zirconium phosphate antibacterial agent, and thereafter the material was subjected to centrifugal separation and vacuum drying to obtain a polypropylene resin powder suitable for selective laser sintering. The particle size and particle size distribution of the obtained polypropylene resin powder were listed in Table 1.

Example 19

100 parts by weight of atactic polypropylene resin (isotacticity 93.9%, melt index (210° C., 2.16 kg) 35 g/10 min, solubility parameter 16.7 MPa$^{1/2}$) and 1000 parts by weight of n-hexane (solubility parameter 14.9 MPa$^{1/2}$) were placed in an autoclave, and 0.2 parts by weight of silica was added and mixed. A high-purity nitrogen gas was charged to 0.2 MPa; then the autoclave was heated up to 120° C., and held at this temperature for 60 minutes; thereafter, the autoclave was cooled down to 80° C. at a rate of 1.0° C./min with cooling water, and held at this temperature for 60 minutes; further, the autoclave was cooled down to room temperature at a rate of 1.0° C./min. In the resulting solid-liquid mixture, were added 0.25 parts by weight of antioxidant 1010 and 0.25 parts by weight of antioxidant 168, 0.5 parts by weight of calcium stearate and 25 parts by weight of ultra-short glass fibers with a diameter of 10 μm and a length of 250 μm, and thereafter the material was subjected to centrifugal separation and vacuum drying to obtain an atactic polypropylene resin powder suitable for selective laser sintering. The particle size and particle size distribution of the obtained polypropylene resin powder were listed in Table 1.

Example 20

100 parts by weight of polyethylene resin (density 0.950 g/cm$^3$, melt index (190° C., 2.16 kg) 40 g/10 min, solubility parameter 17.0 MPa$^{1/2}$) and 1000 parts by weight of n-hexane (solubility parameter 14.9 MPa$^{1/2}$) were placed in an autoclave. A high-purity nitrogen gas was charged to 0.2 MPa; then the autoclave was heated up to 110° C., and held at this temperature for 60 minutes; thereafter, the autoclave was cooled down to 70° C. at a rate of 1.0° C./min with cooling water, and held at this temperature for 60 minutes; further, the autoclave was cooled down to room temperature at a rate of 1.0° C./min. In the resulting solid-liquid mixture, were added 0.25 parts by weight of antioxidant 1010 and 0.25 parts by weight of antioxidant 168 as well as 0.5 parts by weight of calcium stearate, and thereafter the material was subjected to centrifugal separation and vacuum drying to obtain a polyethylene resin powder suitable for selective laser sintering. The particle size and particle size distribution of the obtained polyethylene resin powder were listed in Table 1.

Example 21

100 parts by weight of polyethylene resin (density 0.960 g/cm$^3$, melt index (190° C., 2.16 kg) 60 g/10 min, solubility parameter 17.0 MPa$^{1/2}$) and 800 parts by weight of n-hexane (solubility parameter 14.9 MPa$^{1/2}$) were placed in an autoclave. A high-purity nitrogen gas was charged to 0.3 MPa; then the autoclave was heated up to 120° C., and held at this temperature for 30 minutes; thereafter, the autoclave was cooled down to 65° C. at a rate of 1.0° C./min with cooling water, and held at this temperature for 60 minutes; further, the autoclave was cooled down to 20° C. at a rate of 1.0° C./min, and held at this temperature for 60 minutes. In the resulting solid-liquid mixture, were added 0.25 parts by weight of antioxidant 1010 and 0.25 parts by weight of antioxidant 168 as well as 1 part by weight of zinc stearate, and thereafter the material was subjected to centrifugal separation and vacuum drying to obtain a polyethylene resin powder suitable for selective laser sintering. The particle size and particle size distribution of the obtained polyethylene resin powder were listed in Table 1.

Example 22

100 parts by weight of polyethylene resin (density 0.970 g/cm$^3$, melt index (190° C., 2.16 kg) 50 g/10 min, solubility parameter 17.0 MPa$^{1/2}$) and 1200 parts by weight of n-hexane (solubility parameter 14.9 MPa$^{1/2}$) were placed in an autoclave. A high-purity nitrogen gas was charged to 0.1 MPa; then the autoclave was heated up to 100° C., and held at this temperature for 90 minutes; thereafter, the autoclave was cooled down to room temperature at a rate of 0.1° C./min. In the resulting solid-liquid mixture, were added 0.1 parts by weight of antioxidant 1010 and 0.1 parts by weight of antioxidant 168 as well as 0.75 parts by weight of nano-silica and thereafter the material was subjected to centrifugal separation and vacuum drying to obtain a polyethylene resin powder suitable for selective laser sintering. The particle size and particle size distribution of the obtained polyethylene resin powder were listed in Table 1.

Example 23

100 parts by weight of polyethylene resin (density 0.954 g/cm$^3$, melt index (190° C., 2.16 kg) 70 g/10 min, solubility parameter 17.0 MPa$^{1/2}$) and 1200 parts by weight of n-hexane (solubility parameter 14.9 MPa$^{1/2}$) were placed in an autoclave. A high-purity nitrogen gas was charged to 0.1 MPa; then the autoclave was heated up to 100° C., and held at this temperature for 90 minutes; thereafter, the autoclave was cooled down to 65° C. at a rate of 0.5° C./min with cooling water, and held at this temperature for 60 minutes; further, the autoclave was cooled down to room temperature at a rate of 0.1° C./min and held at this temperature for 60 minutes. In the resulting solid-liquid mixture, were added 0.3 parts by weight of antioxidant 1010 and 0.3 parts by weight of antioxidant 168 as well as 0.9 parts by weight of nano-zinc oxide, and thereafter the material was subjected to centrifugal separation and vacuum drying to obtain a polyethylene resin powder suitable for selective laser sintering. The particle size and particle size distribution of the obtained polyethylene resin powder were listed in Table 1.

Example 24

100 parts by weight of polyethylene resin (density 0.948 g/cm$^3$, melt index (190° C., 2.16 kg) 65 g/10 min, solubility parameter 17.0 MPa$^{1/2}$) and 1000 parts by weight of n-hexane (solubility parameter 14.9 MPa$^{1/2}$) were placed in an autoclave. A high-purity nitrogen gas was charged to 0.3 MPa; then the autoclave was heated up to 100° C., and held at this temperature for 30 minutes; thereafter, the autoclave was cooled down to 30° C. at a rate of 0.5° C./min with cooling water, and held at this temperature for 30 minutes. In the resulting solid-liquid mixture, were added 0.2 parts by weight of antioxidant 1010 and 0.2 parts by weight of antioxidant 168 as well as 0.6 parts by weight of nano-calcium carbonate, and thereafter the material was subjected to centrifugal separation and vacuum drying to obtain a polyethylene resin powder suitable for selective laser sintering. The particle size and particle size distribution of the obtained polyethylene resin powder were listed in Table 1.

Example 25

100 parts by weight of polyethylene resin (density 0.962 g/cm$^3$, melt index (190° C., 2.16 kg) 40 g/10 min, solubility parameter 17.0 MPa$^{1/2}$) and 1200 parts by weight of n-heptane (solubility parameter 15.2 MPa$^{1/2}$) were placed in an autoclave. A high-purity nitrogen gas was charged to 0.2 MPa; then the autoclave was heated up to 100° C., and held at this temperature for 90 minutes; thereafter, the autoclave was cooled down to 60° C. at a rate of 0.5° C./min with cooling water, and held at this temperature for 90 minutes; further, the autoclave was cooled down to room temperature at a rate of 0.2° C./min. In the resulting solid-liquid mixture, were added 0.15 parts by weight of antioxidant 1010 and 0.15 parts by weight of antioxidant 168 as well as 0.8 parts by weight of sodium stearate, and thereafter the material was subjected to centrifugal separation and vacuum drying to obtain a polyethylene resin powder suitable for selective laser sintering. The particle size and particle size distribution of the obtained polyethylene resin powder were listed in Table 1.

Example 26

100 parts by weight of polyethylene resin (density 0.950 g/cm$^3$, melt index (190° C., 2.16 kg) 40 g/10 min, solubility parameter 17.0 MPa$^{1/2}$) and 1000 parts by weight of cyclohexane (solubility parameter 16.6 MPa$^{1/2}$) were placed in an autoclave. A high-purity nitrogen gas was charged to 0.2 MPa; then the autoclave was heated up to 110° C., and held at this temperature for 60 minutes; thereafter, the autoclave was cooled down to 70° C. at a rate of 1.0° C./min with cooling water, and held at this temperature for 60 minutes; further, the autoclave was cooled down to room temperature at a rate of 1.0° C./min. In the resulting solid-liquid mixture, were added 0.25 parts by weight of antioxidant 1010 and 0.25 parts by weight of antioxidant 168 as well as 0.5 parts by weight of calcium stearate, and thereafter the material was subjected to centrifugal separation and vacuum drying to obtain a polyethylene resin powder suitable for selective laser sintering. The particle size and particle size distribution of the obtained polyethylene resin powder were listed in Table 1.

Example 27

100 parts by weight of polyethylene resin (density 0.950 g/cm$^3$, melt index (190° C., 2.16 kg) 40 g/10 min, solubility parameter 17.0 MPa$^{1/2}$) and 1000 parts by weight of 2,2,3-trimethylbutane (solubility parameter 15.7 MPa$^{1/2}$) were placed in an autoclave. A high-purity nitrogen gas was charged to 0.2 MPa; then the autoclave was heated up to 110° C., and held at this temperature for 60 minutes; thereafter, the autoclave was cooled down to 70° C. at a rate of 1.0° C./min with cooling water, and held at this temperature for 60 minutes; further, the autoclave was cooled down to room temperature at a rate of 1.0° C./min. In the resulting solid-liquid mixture, were added 0.25 parts by weight of antioxidant 1010 and 0.25 parts by weight of antioxidant 168 as well as 0.5 parts by weight of calcium stearate, and thereafter the material was subjected to centrifugal separation and vacuum drying to obtain a polyethylene resin powder suitable for selective laser sintering. The particle size and particle size distribution of the obtained polyethylene resin powder were listed in Table 1.

Example 28

100 parts by weight of polyethylene resin (density 0.930 g/cm$^3$, melt index (190° C., 2.16 kg) 30 g/10 min, solubility parameter 17.0 MPa$^{1/2}$) and 1000 parts by weight of n-hexane (solubility parameter 14.9 MPa$^{1/2}$) were placed in an autoclave. A high-purity nitrogen gas was charged to 0.2 MPa; then the autoclave was heated up to 100° C., and held at this temperature for 60 minutes; thereafter, the autoclave was cooled down to 60° C. at a rate of 1.0° C./min with cooling water, and held at this temperature for 60 minutes; further, the autoclave was cooled down to room temperature at a rate of 1.0° C./min. In the resulting solid-liquid mixture, were added 0.25 parts by weight of antioxidant 1010 and 0.25 parts by weight of antioxidant 168 as well as 0.5 parts by weight of calcium stearate, and thereafter the material was subjected to centrifugal separation and vacuum drying to obtain a polyethylene resin powder suitable for selective laser sintering. The particle size and particle size distribution of the obtained polyethylene resin powder were listed in Table 1.

Example 29

100 parts by weight of polyethylene resin (density 0.927 g/cm$^3$, melt index (190° C., 2.16 kg) 70 g/10 min, solubility parameter 17.0 MPa$^{1/2}$) and 800 parts by weight of n-hexane (solubility parameter 14.9 MPa$^{1/2}$) were placed in an autoclave. A high-purity nitrogen gas was charged to 0.3 MPa; then the autoclave was heated up to 110° C., and held at this temperature for 30 minutes; thereafter, the autoclave was cooled down to 55° C. at a rate of 1.0° C./min with cooling water, and held at this temperature for 60 minutes; further, the autoclave was cooled down to 20° C. at a rate of 1.0° C./min, and held at this temperature for 60 minutes. In the resulting solid-liquid mixture, were added 0.25 parts by weight of antioxidant 1010 and 0.25 parts by weight of antioxidant 168 as well as 1 part by weight of zinc stearate, and thereafter the material was subjected to centrifugal separation and vacuum drying to obtain a polyethylene resin powder suitable for selective laser sintering. The particle size and particle size distribution of the obtained polyethylene resin powder were listed in Table 1.

Example 30

100 parts by weight of polyethylene resin (density 0.920 g/cm$^3$, melt index (190° C., 2.16 kg) 50 g/10 min, solubility parameter 17.0 MPa$^{1/2}$) and 1200 parts by weight of n-hexane (solubility parameter 14.9 MPa$^{1/2}$) were placed in an autoclave. A high-purity nitrogen gas was charged to 0.1 MPa; then the autoclave was heated up to 90° C., and held at this temperature for 90 minutes; thereafter, the autoclave was cooled down to room temperature at a rate of 0.1° C./min. In the resulting solid-liquid mixture, were added 0.1 parts by weight of antioxidant 1010 and 0.1 parts by weight of antioxidant 168 as well as 0.75 parts by weight of nano-silica, and thereafter the material was subjected to centrifugal separation and vacuum drying to obtain a polyethylene resin powder suitable for selective laser sintering. The particle size and particle size distribution of the obtained polyethylene resin powder were listed in Table 1.

Example 31

100 parts by weight of polyethylene resin (density 0.915 g/cm$^3$, melt index (190° C., 2.16 kg) 40 g/10 min, solubility parameter 17.0 MPa$^{1/2}$) and 1200 parts by weight of n-hexane (solubility parameter 14.9 MPa$^{1/2}$) were placed in an autoclave. A high-purity nitrogen gas was charged to 0.1 MPa; then the autoclave was heated up to 90° C., and held at this temperature for 90 minutes; thereafter, the autoclave was cooled down to 55° C. at a rate of 0.5° C./min with cooling water, and held at this temperature for 60 minutes; further, the autoclave was cooled down to room temperature at a rate of 0.1° C./min, and held at this temperature for 60 minutes. In the resulting solid-liquid mixture, were added 0.3 parts by weight of antioxidant 1010 and 0.3 parts by weight of antioxidant 168 as well as 0.9 parts by weight of nano-zinc oxide, and thereafter the material was subjected to centrifugal separation and vacuum drying to obtain a polyethylene resin powder suitable for selective laser sintering. The particle size and particle size distribution of the obtained polyethylene resin powder were listed in Table 1.

Example 32

100 parts by weight of polyethylene resin (density 0.935 g/cm$^3$, melt index (190° C., 2.16 kg) 60 g/10 min, solubility parameter 17.0 MPa$^{1/2}$) and 1000 parts by weight of n-hexane (solubility parameter 14.9 MPa$^{1/2}$) were placed in an autoclave. A high-purity nitrogen gas was charged to 0.3 MPa; then the autoclave was heated up to 90° C., and held at this temperature for 30 minutes; thereafter, the autoclave was cooled down to 30° C. at a rate of 0.5° C./min with cooling water, and held at this temperature for 30 minutes. In the resulting solid-liquid mixture, were added 0.2 parts by weight of antioxidant 1010 and 0.2 parts by weight of antioxidant 168 as well as 0.6 parts by weight of nano-calcium carbonate, and thereafter the material was subjected to centrifugal separation and vacuum drying to obtain a polyethylene resin powder suitable for selective laser sintering. The particle size and particle size distribution of the obtained polyethylene resin powder were listed in Table 1.

Example 33

100 parts by weight of polyethylene resin (density 0.924 g/cm$^3$, melt index (190° C., 2.16 kg) 45 g/10 min, solubility parameter 17.0 MPa$^{1/2}$) and 1200 parts by weight of n-heptane (solubility parameter 15.2 MPa$^{1/2}$) were placed in an autoclave. A high-purity nitrogen gas was charged to 0.2 MPa; then the autoclave was heated up to 90° C., and held at this temperature for 90 minutes; thereafter, the autoclave was cooled down to 50° C. at a rate of 0.5° C./min with cooling water, and held at this temperature for 90 minutes; further, the autoclave was cooled down to room temperature at a rate of 0.2° C./min. In the resulting solid-liquid mixture, were added 0.15 parts by weight of antioxidant 1010 and 0.15 parts by weight of antioxidant 168 as well as 0.8 parts by weight of sodium stearate, and thereafter the material was subjected to centrifugal separation and vacuum drying to obtain a polyethylene resin powder suitable for selective laser sintering. The particle size and particle size distribution of the obtained polyethylene resin powder were listed in Table 1.

Example 34

100 parts by weight of polyethylene resin (density 0.930 g/cm$^3$, melt index (190° C., 2.16 kg) 30 g/10 min, solubility parameter 17.0 MPa$^{1/2}$) and 1000 parts by weight of n-pentane (solubility parameter 14.4 MPa$^{1/2}$) were placed in an autoclave. A high-purity nitrogen gas was charged to 0.2 MPa; then the autoclave was heated up to 100° C., and held at this temperature for 60 minutes; thereafter, the autoclave was cooled down to 60° C. at a rate of 1.0° C./min with cooling water, and held at this temperature for 60 minutes; further, the autoclave was cooled down to room temperature at a rate of 1.0° C./min. In the resulting solid-liquid mixture, were added 0.25 parts by weight of antioxidant 1010 and 0.25 parts by weight of antioxidant 168 as well as 0.5 parts by weight of calcium stearate, and thereafter the material was subjected to centrifugal separation and vacuum drying to obtain a polyethylene resin powder suitable for selective laser sintering. The particle size and particle size distribution of the obtained polyethylene resin powder were listed in Table 1.

Example 35

100 parts by weight of polyethylene resin (density 0.930 g/cm$^3$, melt index (190° C., 2.16 kg) 30 g/10 min, solubility parameter 17.0 MPa$^{1/2}$) and 1000 parts by weight of n-octane (solubility parameter 15.4 MPa$^{1/2}$) were placed in an autoclave. A high-purity nitrogen gas was charged to 0.2 MPa; then the autoclave was heated up to 100° C., and held at this temperature for 60 minutes; thereafter, the autoclave was cooled down to 60° C. at a rate of 1.0° C./min with cooling water, and held at this temperature for 60 minutes; further, the autoclave was cooled down to room temperature at a rate of 1.0° C./min. In the resulting solid-liquid mixture, were added 0.25 parts by weight of antioxidant 1010 and 0.25 parts by weight of antioxidant 168 as well as 0.5 parts by weight of calcium stearate, and thereafter the material was subjected to centrifugal separation and vacuum drying to obtain a polyethylene resin powder suitable for selective laser sintering. The particle size and particle size distribution of the obtained polyethylene resin powder were listed in Table 1.

Example 36

100 parts by weight of polyethylene resin (density 0.950 g/cm$^3$, melt index (190° C., 2.16 kg) 35 g/10 min, solubility parameter 17.0 MPa$^{1/2}$) and 1000 parts by weight of n-hexane (solubility parameter 14.9 MPa$^{1/2}$) were placed in an autoclave. A high-purity nitrogen gas was charged to 0.2 MPa; then the autoclave was heated up to 110° C., and held at this temperature for 60 minutes; thereafter, the autoclave was cooled down to 70° C. at a rate of 1.0° C./min with cooling water, and held at this temperature for 60 minutes; further, the autoclave was cooled down to room temperature at a rate of 1.0° C./min. In the resulting solid-liquid mixture, were added 0.25 parts by weight of antioxidant 1010 and 0.25 parts by weight of antioxidant 168, 0.5 parts by weight of calcium stearate, 2.5 parts by weight of conductive carbon black as well as 0.1 parts by weight of carbon nanotubes, and thereafter the material was subjected to centrifugal separation and vacuum drying to obtain a polyethylene resin powder suitable for selective laser sintering. The particle size and particle size distribution of the obtained polyethylene resin powder were listed in Table 1.

Example 37

100 parts by weight of polyethylene resin (density 0.948 g/cm$^3$, melt index (190° C., 2.16 kg) 60 g/10 min, solubility parameter 17.0 MPa$^{1/2}$) and 1000 parts by weight of n-hexane (solubility parameter 14.9 MPa$^{1/2}$) were placed in an autoclave. A high-purity nitrogen gas was charged to 0.3 MPa; then the autoclave was heated up to 100° C., and held at this temperature for 30 minutes; thereafter, the autoclave was cooled down to 30° C. at a rate of 0.5° C./min with cooling water, and held at this temperature for 30 minutes. In the resulting solid-liquid mixture, were added 0.2 parts by weight of antioxidant 1010 and 0.2 parts by weight of antioxidant 168, 0.6 parts by weight of nano-calcium carbonate as well as 0.05 parts by weight of zinc pyrithione, and thereafter the material was subjected to centrifugal separation and vacuum drying to obtain a polyethylene resin powder suitable for selective laser sintering. The particle size and particle size distribution of the obtained polyethylene resin powder were listed in Table 1.

Example 38

100 parts by weight of polyethylene resin (density 0.924 g/cm$^3$, melt index (190° C., 2.16 kg) 40 g/10 min, solubility parameter 17.0 MPa$^{1/2}$) and 1200 parts by weight of n-heptane (solubility parameter 15.2 MPa$^{1/2}$) were placed in an autoclave. A high-purity nitrogen gas was charged to 0.2 MPa; then the autoclave was heated up to 90° C., and held at this temperature for 90 minutes; thereafter, the autoclave was cooled down to 50° C. at a rate of 0.5° C./min with cooling water, and held at this temperature for 90 minutes; further, the autoclave was cooled down to room temperature at a rate of 0.2° C./min. In the resulting solid-liquid mixture, were added 0.15 parts by weight of antioxidant 1010 and 0.15 parts by weight of antioxidant 168, 0.8 parts by weight of sodium stearate as well as 50 parts by weight of ultra-short glass fibers with a diameter of 5 μm and a length of 150 μm, and thereafter the material was subjected to centrifugal separation and vacuum drying to obtain a polyethylene resin powder suitable for selective laser sintering. The particle size and particle size distribution of the obtained polyethylene resin powder were listed in Table 1.

TABLE 1

| Example | Particle size (μm) | D10 (μm) | D50 (μm) | D90 (μm) | Bulk density (g/cm$^3$) |
|---|---|---|---|---|---|
| Example 1 | 35~120 | 53 | 86 | 105 | 0.45 |
| Example 2 | 40~130 | 55 | 94 | 118 | 0.41 |
| Example 3 | 30~107 | 47 | 65 | 88 | 0.49 |
| Example 4 | 35~130 | 52 | 78 | 108 | 0.45 |
| Example 5 | 30~110 | 45 | 71 | 98 | 0.52 |
| Example 6 | 43~137 | 55 | 85 | 113 | 0.42 |
| Example 7 | 45~132 | 55 | 90 | 108 | 0.46 |
| Example 8 | 45~130 | 52 | 81 | 104 | 0.44 |
| Example 9 | 35~125 | 52 | 84 | 102 | 0.48 |
| Example 10 | 40~120 | 58 | 81 | 97 | 0.45 |
| Example 11 | 25~130 | 41 | 61 | 107 | 0.55 |
| Example 12 | 40~135 | 55 | 86 | 109 | 0.44 |
| Example 13 | 30~150 | 48 | 103 | 138 | 0.38 |
| Example 14 | 45~120 | 58 | 80 | 95 | 0.42 |
| Example 15 | 42~130 | 58 | 80 | 115 | 0.42 |
| Example 16 | 45~127 | 64 | 85 | 115 | 0.44 |
| Example 17 | 45~135 | 49 | 84 | 122 | 0.43 |
| Example 18 | 42~125 | 56 | 82 | 105 | 0.44 |
| Example 19 | 40~130 | 50 | 84 | 108 | 0.42 |
| Example 20 | 45~135 | 59 | 90 | 112 | 0.44 |
| Example 21 | 40~130 | 55 | 94 | 115 | 0.45 |
| Example 22 | 30~127 | 48 | 75 | 101 | 0.57 |
| Example 23 | 35~130 | 50 | 89 | 110 | 0.50 |
| Example 24 | 35~120 | 49 | 71 | 95 | 0.52 |
| Example 25 | 40~130 | 56 | 85 | 106 | 0.47 |
| Example 26 | 42~130 | 58 | 80 | 115 | 0.44 |
| Example 27 | 45~127 | 64 | 85 | 115 | 0.45 |
| Example 28 | 35~115 | 45 | 71 | 92 | 0.56 |
| Example 29 | 50~130 | 61 | 91 | 115 | 0.40 |
| Example 30 | 30~100 | 46 | 66 | 85 | 0.54 |
| Example 31 | 35~120 | 52 | 79 | 100 | 0.50 |
| Example 32 | 50~150 | 69 | 97 | 120 | 0.37 |
| Example 33 | 45~130 | 67 | 96 | 114 | 0.43 |
| Example 34 | 45~132 | 55 | 90 | 108 | 0.43 |
| Example 35 | 45~130 | 52 | 81 | 104 | 0.46 |
| Example 36 | 30~110 | 46 | 74 | 90 | 0.52 |
| Example 37 | 50~130 | 65 | 88 | 115 | 0.48 |
| Example 38 | 45~120 | 58 | 85 | 110 | 0.41 |

Example 39

Example 1 was repeated except that nucleating agent calcium oxide was not used. Since there was no nucleating agent in this example, molten polypropylene had less nucleating points during crystallization and thus spherulite size was larger. The finally obtained polypropylene powder particles for laser sintering had a larger particle size, ranging from 70 to 150 μm, with D10=92 μm, D50=113 μm, and D90=132 μm. Although the obtained polypropylene resin powder could satisfy the basic requirements of laser sintering process, it had a greater fraction of particles with larger size than that of Example 1.

Example 40

Example 1 was repeated except that no antioxidant was used. Since there was no antioxidant in this example, the obtained polypropylene powder tended to be degraded and yellowing upon heating when used for laser sintering. Although the obtained polypropylene resin powder could satisfy the basic requirements of laser sintering process, the mechanical properties of the finished printed product were inadequate compared with Example 1.

Example 41

Example 1 was repeated except that no release agent was used. Since there was no release agent in this example, the obtained polypropylene powder tended to agglomerate in a small quantity, and had a slightly poorer flowability compared with Example 1. Although the obtained polypropylene resin powder could satisfy the basic requirements of laser sintering process, the finished printed product had a slightly worse surface smoothness.

Example 42

Example 20 was repeated except that no antioxidant was used. Since there was no antioxidant in this embodiment, the obtained polyethylene powder tended to be cross-linked upon heating when used for laser sintering compared with Example 20. Although the obtained polyethylene resin powder could satisfy the basic requirements of laser sintering process, the finished printed product was prone to shrink.

Example 43

Example 20 was repeated except that no release agent was used. Since there was no release agent in this example, the obtained polyethylene powder tended to agglomerate in a small quantity, and had a slightly poorer flowability compared with Example 20. Although the obtained polyethylene resin powder could satisfy the basic requirements of laser sintering process, the finished printed product had a slightly worse surface smoothness.

Example 44

Example 20 was repeated except that the release agent and the antioxidant were not used. Since there were neither release agent nor antioxidant in this example, the obtained polyethylene powder tended to be cross-linked upon heating when used for laser sintering, and tended to agglomerate in a small quantity, and had a slightly poorer flowability compared with Example 20. Although the obtained polyethylene resin powder could satisfy the basic requirements of laser sintering process, the finished printed product was prone to shrink and had a slightly worse surface smoothness.

Comparative Example 1

Example 1 was repeated except that xylene solvent (solubility parameter 18.2 $MPa^{1/2}$) was used instead of n-hexane solvent. Since the xylene solvent used in this comparative example was a good solvent for polypropylene, the polypropylene, after dissolved, had a very slow crystallization rate upon cooling. In the same experimental time as that in Example 1, the particle size of the obtained polypropylene powder particles for laser sintering was too small and the particle size distribution was worse (the particle size ranging from 10 to 55 μm, D10=15 μm, D50=24 μm, D90=49 μm). The obtained polypropylene resin powder could not satisfactorily meet the requirements of laser sintering process.

Comparative Example 2

Example 1 was repeated except that toluene solvent (solubility parameter 18.4 $MPa^{1/2}$) was used instead of n-hexane solvent. Since the toluene solvent used in this comparative example was a good solvent for polypropylene, the polypropylene, after dissolved, had a very slow crystallization rate upon cooling. In the same experimental time as that in Example 1, the particle size of the obtained polypropylene powder particles for laser sintering was too small and the particle size distribution was worse (the particle size ranging from 16 to 52 μm, D10=25 μm, D50=34 μm, D90=40 μm). The obtained polypropylene resin powder could not satisfactorily meet the requirements of laser sintering process.

The above examples and comparative examples illustrate that the polyolefin resin powder obtained according to the method of the present invention has good oxidation resistance, good powder flowability, moderate size, suitable bulk density, well-proportioned particle shape and uniform particle size distribution, which is suitable for selective laser sintering to prepare various molded products. With the selective laser sintering method provided by the present invention, polyolefin molded products having regular shape, smooth surface and good mechanical properties can be prepared.

Although the present invention has been described in detail, modifications within the spirit and scope of the present invention will be apparent to those skilled in the art. In addition, it should be understood that various aspects of the present invention described herein, various parts of different embodiments, and various features listed may be combined or totally or partially interchanged. In the respective embodiments described above, those embodiments that refer to another specific embodiment can be combined with other embodiments as appropriate, as will be understood by those skilled in the art. Moreover, those skilled in the art will understand that the foregoing description is by way of example only and is not intended to limit the present invention.

The invention claimed is:

1. A method for preparing a polyolefin resin powder, comprising:
   a) heating and dissolving a polyolefin resin in an organic solvent having a solubility parameter less than or equal to a solubility parameter of the polyolefin resin to obtain a polyolefin resin solution;
   b) cooling the polyolefin resin solution to cause precipitation of a solid, thereby obtaining a solid-liquid mixture;
   c) optionally adding an adjuvant to the solid-liquid mixture; and
   d) conducting solid-liquid separation and drying the separated solid to obtain a polyolefin resin powder,
   wherein a difference between the solubility parameter of the organic solvent and the solubility parameter of the polyolefin resin is within 0-20% of the solubility parameter of the polyolefin resin,
   wherein, in the polyolefin resin solution, an amount of the organic solvent is 600-1200 parts by weight, based on an amount of 100 parts by weight of the polyolefin resin,
   wherein, in step b), the polyolefin resin solution is cooled to a target temperature via one or more intermediate temperatures and held for 30-90 minutes at each of said one or more intermediate temperatures,
   wherein the one or more intermediate temperatures are in the range of 40-100° C., and
   wherein the polyolefin resin powder obtained from step d) contains particles that are spherical or spheroidal particles having a particle size of 25-150 μm, and a particle size distribution D10=43-69 μm, D50=61-103 μm, and D90=85-138 μm.

2. The method according to claim 1, wherein, in step a), the polyolefin resin is at least one selected from the group consisting of polypropylene resin, polyethylene resins, homopolypropylene resin, atactic polypropylene resin, and mixtures thereof.

3. The method according to claim 2, wherein the homopolypropylene resin and the atactic polypropylene resin have a melt index of 20-100 g/10 min, measured at 210° C. and a load of 2.16 kg, and the polyethylene resin has a melt index of 20-100 g/10 min, measured at 190° C. and a load of 2.16 kg.

4. The method according to claim 1, wherein the amount of the organic solvent is 800-1000 parts by weight, based on 100 parts by weight of the polyolefin resin.

5. The method according to claim 1, wherein the organic solvent is selected from the group consisting of $C_5$-$C_{12}$ alkanes, n-pentane, isopentane, n-hexane, 2-methylpentane, 3-methylpentane, 2,2-dimethylbutane, 2,3-dimethylbutane, cyclohexane, n-heptane, 2-methylhexane, 3-methylhexane, 2,2-dimethylpentane, 2,3-dimethylpentane, 2,4-dimethylpentane, 3,3-dimethylpentane, 3-ethylpentane, 2,2,3-trimethylbutane, n-octane, and n-nonane.

6. The method according to claim 1, wherein, in step a), the polyolefin resin is heated to a temperature of 60-200° C. and held at said temperature for 30-90 minutes.

7. The method according to claim 1, further comprising adding a nucleating agent to the polyolefin resin, wherein the nucleating agent is selected from the group consisting of silica, calcium oxide, calcium carbonate, barium sulfate, hydrotalcite, carbon black, kaolin, mica, and mixtures thereof.

8. The method according to claim 7, wherein an amount of the nucleating agent is 0.01-2 parts by weight based on 100 parts by weight of the polyolefin resin.

9. The method according to claim 1, wherein the adjuvant in step c) is selected from the group consisting of antioxidants, powder release agents, antistatic agents, antibacterial agents, glass fiber reinforcements, and mixtures thereof.

10. The method according to claim 9, wherein the antioxidant is antioxidant 1010, antioxidant 168, or a mixture thereof, wherein an amount of the antioxidant is 0.1-0.5 parts by weight based on 100 parts by weight of the polyolefin resin.

11. The method according to claim 9, wherein the powder release agent is selected from the group consisting of an alkali metal based on alkane monocarboxylic or dimer acids, an alkaline earth metal based on alkane monocarboxylic or dimer acids, a nano-oxide, a nano-metal salt, sodium stearate, potassium stearate, zinc stearate, calcium stearate, lead stearate, silica, titanium dioxide, aluminum oxide, zinc oxide, zirconium oxide, calcium carbonate, barium sulfate, and mixtures thereof; and an amount of the powder release agent is 0.01-10 parts by weight based on 100 parts by weight of the polyolefin resin.

12. A polyolefin resin powder prepared by the method according to claim 1, wherein the powder particles are spherical and/or spheroidal, and have a particle size of 25-150 μm, and a particle size distribution D10=43-69 μm, D50=61-103 μm, and D90=85-138 μm.

13. A selective laser sintering method, comprising sintering the polyolefin resin powder prepared according to the method of claim 1 using laser radiation.

14. A method of manufacturing a three-dimensional object, comprising sintering a polyolefin resin powder prepared according to the method of claim 1.

15. The method according to claim 3, wherein the homopolypropylene resin and the atactic polypropylene resin have a melt index of 30-80 g/10 min, measured at 210° C. and a load of 2.16 kg, and the polyethylene resin has a melt index of 30-80 g/10 min, measured at 190° C. and a load of 2.16 kg.

16. The method according to claim 6, wherein, in step a), the polyolefin resin is heated to a temperature of 70-190° C. and held at said temperature for 30-90 minutes.

17. The method according to claim 16, wherein, in step a), the polyolefin resin is heated to a temperature of 80-160° C. and held at said temperature for 30-90 minutes.

18. The method according to claim 8, wherein the amount of the nucleating agent is 0.05-1 parts by weight, based on 100 parts by weight of the polyolefin resin.

19. The method according to claim 18, wherein the amount of the nucleating agent is 0.1-0.5 parts by weight, based on 100 parts by weight of the polyolefin resin.

20. The method according to claim 10, wherein the amount of the antioxidant is 0.2-0.4 parts by weight, based on 100 parts by weight of the polyolefin resin.

21. The method according to claim 11, wherein the amount of the powder release agent is 0.1-5 parts by weight, based on 100 parts by weight of the polyolefin resin.

22. The method according to claim 21, wherein the amount of the powder release agent is 0.5-1 parts by weight, based on 100 parts by weight of the polyolefin resin.

23. A method for preparing a polyolefin resin powder, comprising:
a) heating and dissolving a polyolefin resin in an organic solvent having a solubility parameter less than or equal to a solubility parameter of the polyolefin resin to obtain a polyolefin resin solution;
b) cooling the polyolefin resin solution to cause precipitation of a solid, thereby obtaining a solid-liquid mixture;
c) optionally adding an adjuvant to the solid-liquid mixture; and
d) conducting solid-liquid separation and drying the separated solid to obtain a polyolefin resin powder,
wherein a difference between the solubility parameter of the organic solvent and the solubility parameter of the polyolefin resin is within 0-20% of the solubility parameter of the polyolefin resin,
wherein, in the polyolefin resin solution, an amount of the organic solvent is 600-1200 parts by weight, based on an amount of 100 parts by weight of the polyolefin resin, and
wherein, in step b), the polyolefin resin solution is cooled to a target temperature of 10° C.-30° C. at an average cooling rate of 0.1° C./min to 1° C./min, and is held for 30-90 minutes at the target temperature.

* * * * *